United States Patent [19]

Nye

[11] Patent Number: 5,204,442
[45] Date of Patent: Apr. 20, 1993

[54] POLYETHER POLYMERS DERIVED FROM 4,4"-DIHYDROXY-M-TERPHENYLS

[75] Inventor: Susan A. Nye, Feura Bush, N.Y.

[73] Assignee: General Electric Company, Schenectady, N.Y.

[21] Appl. No.: 651,171

[22] Filed: Feb. 6, 1991

[51] Int. Cl.$^5$ .................... C08G 8/02; C08G 14/00; C08G 65/38; C08G 75/23
[52] U.S. Cl. .................... 528/125; 528/126; 528/128; 528/171; 528/174; 528/175; 528/219; 528/220
[58] Field of Search .............. 528/125, 126, 128, 174, 528/175, 219, 171, 220

[56] References Cited

U.S. PATENT DOCUMENTS

| | | | |
|---|---|---|---|
| 4,064,176 | 12/1977 | Rabilloud | 528/125 |
| 4,503,214 | 3/1985 | White | 528/212 |
| 4,870,153 | 9/1989 | Matzner et al. | 528/125 |
| 4,910,289 | 3/1990 | Harris | 528/128 |
| 4,950,729 | 8/1990 | Daniels | 528/125 |
| 4,957,978 | 9/1990 | Harris | 528/125 |
| 4,960,851 | 10/1990 | Staniland | 528/125 |
| 5,049,496 | 9/1991 | Mobley | 435/130 |

OTHER PUBLICATIONS

"The Synthesis of Two Dihydroxyterphenyls", pp. 632–633, vol. 66, by Charles C. Price, et al.

Primary Examiner—John Kight, III
Assistant Examiner—P. Hampton-Hightower
Attorney, Agent, or Firm—William H. Pittman

[57] ABSTRACT

Polyether polymers are prepared from 4,4"-dihydroxy-m-terphenyls, especially the unsubstituted dihydroxyterphenyl, by reaction under alkaline conditions with bis(4-halophenyl) sulfones, 4,4'-dihalobenzophenones or gem-dihaloalkanes. Both homopolymers and copolymers with other dihydroxyaromatic compounds, particularly bisphenol A, may be prepared. They have glass transition temperatures higher than those of the corresponding bisphenol A-derived polymers.

19 Claims, No Drawings

POLYETHER POLYMERS DERIVED FROM 4,4''-DIHYDROXY-M-TERPHENYLS

This invention relates to new compositions of matter, and more particularly to new polyethers derived from 4,4''-dihydroxy-m-terphenyls.

Among the types of polyether polymers known in the art are polyetherketones, polyethersulfones and polyformals. Each of these is characterized by properties which make them useful in certain applications. For the most part, they are prepared from 2,2'-bis(4-hydroxyphenyl)propane, or "bisphenol A".

It would be desirable to prepare similar polyether polymers having higher processing temperatures, as demonstrated by higher glass transition temperatures (Tg), than those of the bisphenol A-derived polymers. This is accomplished by the present invention.

The invention includes polymers comprising structural units of the formula

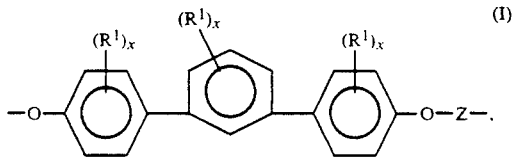

wherein:
Z is

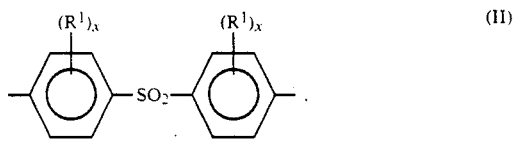

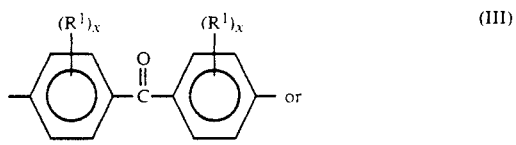

or

each $R^1$ is independently a substantially inert substituent;
each of $R^2$ and $R^3$ is hydrogen, $C_{1-4}$ primary or secondary alkyl or phenyl; and
each x is independently 0-4.

As is apparent from formula I, the polymers of this invention are characterized by the presence of units derived from 4,4''-dihydroxy-m-terphenyls which may be substituted or unsubstituted. Any substituents should be inert under conditions of reactive contact with alkyl or aryl halides, which are essential reagents for condensation with the dihydroxyterphenyl to prepare the polymers of the invention. Illustrative $R^1$ groups are alkyl, alkenyl, nitro, alkoxy and the like.

The value of each x in formula I, and elsewhere in the context of the present invention, may be from 0 to 4. Most often, each x is 0.

4,4''-Dihydroxy-m-terphenyls which may be employed in the preparation of the polymers of this invention may be prepared by microbiological hydroxylation of the corresponding non-hydroxylated terphenyls. A method for such hydroxylation, using strains of the fungus *Aspergillus parasiticul*, is disclosed in copending application Ser. No. 07/632,887 filed Dec. 24, 1990, now U.S. Pat. No. 5,049,496, the disclosure of which is incorporated by reference herein.

The present invention includes homopolymers containing only units of formula I. It also includes copolymers which additionally contain units of the formula $$-O-A^1-O-Z-. \qquad (V)$$

wherein $A^1$ is a divalent mono- or bicyclic aromatic radical. The proportions of units of formulas I and V in the copolymers are not critical and any proportions may be employed; most often, said copolymers comprise about 40-95% (by number) of units of formula I with the balance (about 5-60% unless units of other molecular structures are also present) being of formula V.

Suitable $A^1$ radicals include m-phenylene, p-phenylene, 4,4'-biphenylene, 4,4'-bi(3,5-dimethyl)phenylene, 2,2-bis(4-phenylene)propane and similar radicals such as those which correspond to the dihydroxy compounds disclosed by name or formula (generic or specific) in U.S. Pat. No. 4,217,438. Also included are radicals containing nonhydrocarbon moieties. These may be substituents such as those enumerated above, and also linking radicals such as thio, sulfoxy, sulfone, ester, amide, ether and carbonyl. Most often, however, $A^1$ is an unsubstituted hydrocarbon radical.

The $A^1$ radical preferably has the formula $$-A^2-Y-A^3-. \qquad (VI)$$

wherein each of $A^2$ and $A^3$ is a monocyclic divalent aromatic radical and Y is a bridging radical in which one or two atoms separate $A^2$ from $A^3$. The free valence bonds in formula VI are usually in the meta or para positions of $A^2$ and $A^3$ in relation to Y.

In formula VI, the $A^2$ and $A^3$ values may be unsubstituted phenylene or substituted derivatives thereof. Unsubstituted phenylene radicals are preferred. Both $A^2$ and $A^3$ are preferably p-phenylene, although both may be o- or m-phenylene or one o- or m-phenylene and the other p-phenylene.

The bridging radical, Y, is one in which one or two atoms, preferably one, separate $A^2$ from $A^3$. It is most often a hydrocarbon radical and particularly a saturated radical such as methylene, cyclohexylmethylene, 2-[2.2.1]bicycloheptylmethylene, ethylene, isopropylidene, neopentylidene, cyclohexylidene, cyclopentadecylidene, cyclododecylidene or adamantylidene, especially a gemalkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone. For reasons of availability and particular suitability for the purposes of this invention, the preferred radical of formula VI is the 2,2-bis(4-phenylene)propane radical, which is derived from bisphenol A and in which Y is isopropylidene and $A^2$ and $A^3$ are each p-phenylene.

The polymers of this invention include polyethersulfones, wherein Z has formula II; polyetherketones, wherein it has formula III; and polyalkylals, wherein it has formula IV. In formulas II and III, x is as defined hereinabove. In formula IV, each of $R^2$ and $R^3$ may be hydrogen, $C_{1-4}$ primary or secondary alkyl or phenyl;

most often, both $R^2$ and $R^3$ are hydrogen (i.e., the polymer is a polyformate).

The methods used for the preparation of the polymers of this invention are conventional methods for polyether polymers of this type. They involve the reaction under alkaline conditions of a terphenyldiol of the formula

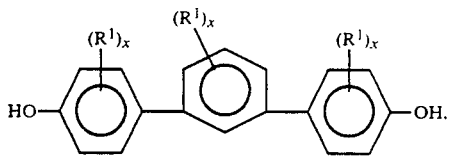

wherein $R^1$ and x are as previously defined, optionally in admixture with at least one dihydroxy compound of the formula HO—$A^1$—OH, with at least one halogen-containing compound selected from the group consisting of bis(4-halophenyl) sulfones, 4,4'-dihalobenzophenones and gem-dihaloalkanes. An illustrative bis(4-halophenyl) sulfone is bis(4-chlorophenyl) sulfone, an illustrative 4,4'-dihalobenozphenone is 4,4'-difluorobenzophenone and an illustrative gem-dihaloalkane is methylene chloride.

In general, approximately equimolar proportions of the dihydroxyaromatic compound(s) and halogen-containing compounds are employed, and the molar ratio of base to dihydroxyaromatic compound(s) is about 2-4:1. Suitable bases include sodium hydroxide, potassium hydroxide, sodium carbonate and potassium carbonate. The reaction is preferably conducted in at least one organic solvent, often in the combination of a polar aprotic solvent such as dimethylformamide, dimethylacetamide, dimethyl sulfoxide or N-methylpyrrolidone and a non-polar solvent such as toluene, xylene, chlorobenzene or o-dichlorobenzene. Typical reaction temperatures are in the range of about 100°–350° C.

The polymers of this invention have properties similar to known polyethersulfones, polyetherketones and polyalkylals (especially polyformals). However, they have higher glass transition temperatures than the corresponding bisphenol A-derived polymers and therefore can be expected to be more resistant to high temperature conditions.

The preparation of the polymers of this invention is illustrated by the following examples. All parts are by weight unless otherwise indicated. Molecular weights were determined by gel permeation chromatography relative to polystyrene.

EXAMPLE 1

A 250-ml. round-bottomed flask equipped with a condenser and magnetic stirrer was charged with 1.966 grams (7.498 mmol.) of 4,4''-dihydroxy-m-terphenyl, 2.153 grams (7.498 mmol.) of bis(4-chlorophenyl) sulfone, 2.17 grams (15.7 mmol.) of potassium carbonate, 21 ml. of dimethylacetamide and 9 ml. of toluene. The mixture was heated with stirring, at 110° C. for 1 hour and at 170° C. for 20 hours. It was then cooled and the polymer was precipitated by pouring into methanol containing a small proportion of acetic acid and water. The product was collected by filtration, washed with methanol and dried at 150° C. under vacuum. There was obtained 94% of the theoretical amount of the desired polyethersulfone homopolymer having weight average and number average molecular weights of 69,410 and 9500, respectively. Its glass transition temperature was 221° C.

EXAMPLE 2

A 100-ml. three-necked round-bottomed flask equipped with a Dean-Stark trap with a condenser, a thermometer, a magnetic stirrer and nitrogen purge means was charged with 2.724 grams (10.389 mmol.) of 4,4''dihydroxy-m-terphenyl, 2.370 grams (10.389 mmol.) of bisphenol A, 9 ml. of dimethyl sulfoxide and 26 ml. of chlorobenzene. The mixture was stirred in a nitrogen atmosphere at 70° C. for 1 hour, after which 3.323 grams of 50% aqueous sodium hydroxide solution (41.538 mmol.) was added. The mixture was heated at 125° C. until all of the water and chlorobenzene had collected in the Dean-Stark trap. There was then added a solution of 5.966 grams (20.778 mmol.) of bis(4-chlorophenyl) sulfone in 5 ml. of chlorobenzene. The added chlorobenzene was similarly removed by distillation and heating was continued for 3 hours, after which the mixture was cooled to about 45° C. and diluted with chloroform. The product was precipitated by pouring into methanol, removed by filtration, redissolved in chloroform and again precipitated with methanol, filtered and dried overnight at 140° C. in vacuum. The desired polyethersulfone copolymer was obtained in 89% yield; its weight average and number average molecular weights were 41,600 and 27,400, respectively, and its glass transition temperature was 196° C.

EXAMPLE 3

A 250-ml. round-bottomed flask equipped with a reflux condenser, magnetic stirrer and nitrogen purge means was charged with 5.335 grams (20.35 mmol.) of 4,4'''-dihydroxy-m-terphenyl, 4.440 grams (20.35 mmol.) of 4,4'-difluorobenzophenone, 6.77 grams (49.16 mmol.) of potassium carbonate, 60 ml. of dimethylacetamide and 20 ml. of toluene. The mixture was heated under nitrogen at 180° C. for 18 hours, with vigorous stirring, whereupon a precipitate formed. The mixture was cooled to 50° C. and suspended in 20 ml. of chloroform, and the product was precipitated by adding to 255 ml. of a mixture of 78% (by volume) methanol, 20% water and 2% acetic acid in a blender. It was again suspended in chloroform, precipitated with methanol and filtered, and was dried overnight at 120° C. in vacuum. There was obtained a 93% yield of the desired polyetherketone homopolymer having crystalline melting temperatures of 290° and 325° C. and a glass transition temperature of 162° C.

EXAMPLE 4

A 25-ml. two-necked round-bottomed flask equipped with a reflux condenser, mechanical stirrer and nitrogen purge mans was charged with 889 mg. (2.76 mmol.) of the disodium salt of 4,4''-dihydroxy-m-terphenyl, 609.4 mg. (2.793 mmol.) of 4,4'-difluorobenzophenone and 2.5 grams of diphenyl sulfone. The mixture was heated in a salt bath to 335° C. under nitrogen for 3 hours, with vigorous stirring. It was then cooled to 50° C., whereupon a hard solid was obtained which was recovered by breaking the flask. A portion of the solid was washed in a Soxhlet extractor with methanol, water and second portion of methanol and dried overnight at 120° under vacuum. The glass transition temperature of the resulting polyetherketone homopolymer was 172° C.

EXAMPLE 5

A 100-ml. round-bottomed flask equipped with a condenser and magnetic stirrer was charged with 1.379 grams (5.26 mmol.) of 4,4''-dihydroxy-m-terphenyl, 1.201 grams (5.26 mmol.) of bisphenol A, 2.295 grams (10.52 mmol.) of 4,4'-difluorobenzophenone, 3.43 grams (24.6 mmol.) of potassium carbonate, 40 ml. of N-methylpyrrolidone and 10 ml. of toluene. The mixture was heated at 170° C. with stirring for 20 hours, cooled and precipitated by pouring into the methanol-water-acetic acid mixture of Example 3. The product was removed by filtration, washed with methanol and dried for 16 hours at 150° C. in vacuum. The yield was 100% of theoretical of the desired polyetherketone copolymer; it had a glass transition temperature of 170° C.

EXAMPLE 6

A 50-ml. round-bottomed flask equipped with a mechanical stirrer, condenser and nitrogen purge means was charged with 3,614 parts (13.78 mmol.) of 4,4''-dihydroxy-m-terphenyl, 41.4 parts (0.276 mmol.) of t-butylphenol, 7.7 parts of N-methylpyrrolidone and 6.55 parts of methylene chloride. The mixture was heated to 100° C. under nitrogen, with stirring, and 1,433 parts (35.83 mmol.) of solid sodium hydroxide was added in four portions over 90 minutes. The solution was cooled to about 45° C., diluted with chloroform and precipitated by pouring into methanol. The product was removed by filtration, washed with fresh methanol and dried for 20 hours at 100° C. in vacuum. The yield was 90% of theoretical of the desired polyformal homopolymer; it had weight average and number average molecular weights of 71,030 and 29,930, respectively, and a glass transition temperature of 113° C.

EXAMPLE 7

The procedure of Example 6 was repeated, employing 1,807 parts (6.89 mmol.) of 4,4''-dihydroxy-m-terphenyl and 1,573 parts (6.89 mmol.) of bisphenol A. The product was the desired polyformal copolymer, obtained in 73% yield. It had weight average and number average molecular weights of 136,500 and 30,100, respectively, and a glass transition temperature of 104° C.

What is claimed is:

1. A polymer comprising structural units of the formula

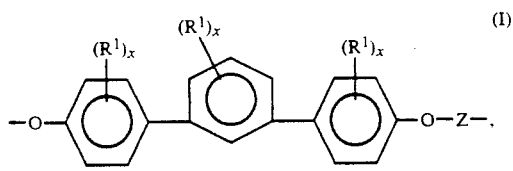

(I)

wherein:
Z is

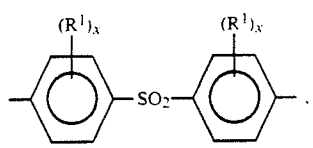

(II)

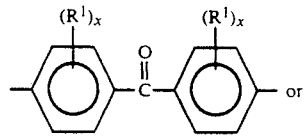

(III)

(IV)

each $R^1$ is independently a substituent which is inert under conditions of reactive contact with alkyl or aryl halides;
each of $R^2$ and $R^3$ is hydrogen, $C_{1-4}$ primary or secondary alkyl or phenyl; and
each x is independently 0–4.

2. A polymer according to claim 1 wherein Z has formula II.

3. A polymer according to claim 2 wherein each x is 0.

4. A polymer according to claim 3 which is a homopolymer.

5. A polymer according to claim 2 which is a copolymer additionally containing about 5–60% of units of the formula

(V)

wherein $A^1$ is a divalent mono- or bicyclic aromatic radical.

6. A copolymer according to claim 5 wherein each x is 0 and $A^1$ is

(VI)

wherein each of $A^2$ and $A^3$ is a monocyclic divalent aromatic radical and Y is a bridging radical in which one or two atoms separate $A^2$ from $A^3$.

7. A copolymer according to claim 6 wherein each of $A^2$ and $A^3$ is p-phenylene and Y is isopropylidene.

8. A polymer according to claim 1 wherein Z has formula III.

9. A polymer according to claim 8 wherein each x is 0.

10. A polymer according to claim 9 which is a homopolymer.

11. A polymer according to claim 8 which is a copolymer additionally containing about 5–60% of units of the formula

(V)

wherein $A^1$ is a divalent mono- or bicyclic aromatic radical.

12. A copolymer according to claim 11 wherein each x is 0 and $A^1$ is

(VI)

wherein each of $A^2$ and $A^3$ is a monocyclic divalent aromatic radical and Y is a bridging radical in which one or two atoms separate $A^2$ from $A^3$.

13. A copolymer according to claim 12 wherein each of $A^2$ and $A^3$ is p-phenylene and Y is isopropylidene.

14. A polymer according to claim 1 wherein Z has formula IV.

15. A polymer according to claim 14 wherein each x is 0 and $R^2$ and $R^3$ are each hydrogen.

16. A polymer according to claim 15 which is a homopolymer.

17. A polymer according to claim 14 which is a copolymer additionally containing about 5-60% of units of the formula $$-O-A^1-O-Z-. \quad (V)$$

wherein $A^1$ is a divalent mono- or bicyclic aromatic radical.

18. A copolymer according to claim 17 wherein each x is 0, $R^2$ and $R^3$ are each hydrogen and $A^1$ is $$-A^2-Y-A^3-. \quad (VI)$$

wherein each of $A^2$ and $A^3$ is a monocyclic divalent aromatic radical and Y is a bridging radical in which one or two atoms separate $A^2$ from $A^3$.

19. A copolymer according to claim 18 wherein each of $A^2$ and $A^3$ is p-phenylene and Y is isopropylidene.

* * * * *